(12) United States Patent
Gitt

(10) Patent No.: US 8,100,034 B2
(45) Date of Patent: *Jan. 24, 2012

(54) GROUP TRANSMISSION FOR A MOTOR VEHICLE

(75) Inventor: Carsten Gitt, Stuttgart (DE)

(73) Assignee: Daimler AG, Stuttgart (DE)

( * ) Notice: Subject to any disclaimer, the term of this patent is extended or adjusted under 35 U.S.C. 154(b) by 478 days.

This patent is subject to a terminal disclaimer.

(21) Appl. No.: 12/378,488

(22) Filed: Feb. 13, 2009

(65) Prior Publication Data

US 2009/0205450 A1    Aug. 20, 2009

Related U.S. Application Data

(63) Continuation-in-part of application No. PCT/EP2007/007235, filed on Aug. 16, 2007.

(30) Foreign Application Priority Data

Aug. 16, 2006  (DE) .......................... 10 2006 038 193

(51) Int. Cl.
*F16H 3/02* (2006.01)
(52) U.S. Cl. ......................................... 74/745
(58) Field of Classification Search .................. None
See application file for complete search history.

(56) References Cited

U.S. PATENT DOCUMENTS

| 5,381,703 | A | 1/1995 | Rankin |
| 7,866,232 | B2 * | 1/2011 | Gitt et al. ......................... 74/745 |
| 2008/0134834 | A1 * | 6/2008 | Gitt et al. ......................... 74/745 |

FOREIGN PATENT DOCUMENTS

| DE | 100 51 354 | 5/2002 |
| DE | 102 39 396 | 3/2004 |
| EP | 0 179 544 | 4/1985 |
| WO | WO 2006/053670 | 5/2006 |
| WO | WO 2007/004663 | 1/2007 |

OTHER PUBLICATIONS

Lechner, G. , "Fahrzeuggetriebe", Springer-Verlag Press, 1994, pp. 154 to 158.

* cited by examiner

*Primary Examiner* — Dirk Wright
(74) *Attorney, Agent, or Firm* — Klaus J. Bach

(57) ABSTRACT

In a group transmission having a number of countershafts, wherein three input constants are provided on a transmission input shaft for driving a countershaft such that the group transmission is of very short construction, the transmission input shaft is connectable to an intermediate shaft for direct power transmission, with the countershaft being disconnectable in the direct gear in order to avoid drag losses.

16 Claims, 15 Drawing Sheets

Fig. 4

| Gear | S1 | | S2 | | | S3 | | | S4 | | | S5 | |
|---|---|---|---|---|---|---|---|---|---|---|---|---|---|
| | S1l | S1r | S2l | N2 | S2r | S3l | N3 | S3r | S4l | N4 | S4r | S5l | S5r |
| V1 |  | ● | ● |  |  |  | ○ |  | ● |  |  | ● |  |
| V2 | ● |  |  | (○) |  |  | ○ |  | ● |  |  | ● |  |
| V3 |  | ● |  |  | ● |  | ○ |  | ● |  |  | ● |  |
| V4 |  | ● | ● |  |  |  |  | ● |  | ○ |  | ● |  |
| V5 | ● |  |  | (○) |  |  |  | ● |  | ○ |  | ● |  |
| V6 |  | ● |  |  | ● |  |  | ● |  | ○ |  | ● |  |
| V7 | ● |  |  |  | ● | ● |  |  |  | ○ |  | ● |  |
| V8 |  | ● |  | ○ |  | ● |  |  |  | ○ |  | ● |  |
| V9 | ● |  | ● |  |  | ● |  |  |  | ○ |  | ● |  |
| V10 |  | ● | ● |  |  |  | ○ |  | ● |  |  |  | ● |
| V11 | ● |  |  | (○) |  |  | ○ |  | ● |  |  |  | ● |
| V12 |  | ● |  |  | ● |  | ○ |  | ● |  |  |  | ● |
| V13 |  | ● | ● |  |  |  |  | ● |  | ○ |  |  | ● |
| V14 | ● |  |  | (○) |  |  |  | ● |  | ○ |  |  | ● |
| V15 |  | ● |  |  | ● |  |  | ● |  | ○ |  |  | ● |
| V16 | ● |  |  |  | ● | ● |  |  |  | ○ |  |  | ● |
| V17 |  | ● |  | ○ |  | ● |  |  |  | ○ |  |  | ● |
| V18 | ● |  | ● |  |  | ● |  |  |  | ○ |  |  | ● |
| R1 |  | ● | ● |  |  |  | ○ |  |  |  | ● | ● |  |
| R2 | ● |  |  | (○) |  |  | ○ |  |  |  | ● | ● |  |
| R3 |  | ● |  |  | ● |  | ○ |  |  |  | ● | ● |  |
| R4 |  | ● | ● |  |  |  | ○ |  |  |  | ● |  | ● |
| R5 | ● |  |  | (○) |  |  | ○ |  |  |  | ● |  | ● |
| R6 |  | ● |  |  | ● |  | ○ |  |  |  | ● |  | ● |

Fig. 10

| Gear | S1 | | S2 | | | S3 | | | S4 | | | S5 | |
|---|---|---|---|---|---|---|---|---|---|---|---|---|---|
| | S1l | S1r | S2l | N2 | S2r | S3l | N3 | S3r | S4l | N4 | S4r | S5l | S5r |
| V1  | ● |   |   | (○) |   |   | ○ |   | ● |   |   | ● |   |
| V2  |   | ● | ● |     |   |   | ○ |   | ● |   |   | ● |   |
| V3  |   | ● |   |     | ● |   | ○ |   | ● |   |   | ● |   |
| V4  | ● |   |   | (○) |   |   |   | ● |   | ○ |   | ● |   |
| V5  |   | ● | ● |     |   |   |   | ● |   | ○ |   | ● |   |
| V6  |   | ● |   |     | ● |   |   | ● |   | ○ |   | ● |   |
| V7  | ● |   | ● |     |   | ● |   |   |   | ○ |   | ● |   |
| V8  | ● |   |   |     | ● | ● |   |   |   | ○ |   | ● |   |
| V9  |   | ● |   | ○   |   | ● |   |   |   | ○ |   | ● |   |
| (V10) | ● |   |   | (○) |   |   | ○ |   | ● |   |   |   | ● |
| (V11) |   | ● | ● |     |   |   | ○ |   | ● |   |   |   | ● |
| (V12) |   | ● |   |     | ● |   | ○ |   | ● |   |   |   | ● |
| V13 | ● |   |   | (○) |   |   |   | ● |   | ○ |   |   | ● |
| V14 |   | ● | ● |     |   |   |   | ● |   | ○ |   |   | ● |
| V15 |   | ● |   |     | ● |   |   | ● |   | ○ |   |   | ● |
| V16 | ● |   | ● |     |   | ● |   |   |   | ○ |   |   | ● |
| V17 | ● |   |   |     | ● | ● |   |   |   | ○ |   |   | ● |
| V18 |   | ● |   | ○   |   | ● |   |   |   | ○ |   |   | ● |
| R1  | ● |   |   | (○) |   |   | ○ |   |   |   | ● | ● |   |
| R2  |   | ● | ● |     |   |   | ○ |   |   |   | ● | ● |   |
| R3  |   | ● |   |     | ● |   | ○ |   |   |   | ● | ● |   |
| R4  | ● |   |   | (○) |   |   | ○ |   |   |   | ● |   | ● |
| R5  |   | ● | ● |     |   |   | ○ |   |   |   | ● |   | ● |
| R6  |   | ● |   |     | ● |   | ○ |   |   |   | ● |   | ● |

Fig. 13

| Gear | S1 | | S2 | | | S3 | | | S4 | | | S5 | |
|---|---|---|---|---|---|---|---|---|---|---|---|---|---|
| | S1l | S1r | S2l | N2 | S2r | S3l | N3 | S3r | S4l | N4 | S4r | S5l | S5r |
| V1  |   | ● |   |     | ● |   | ○ |   | ● |   |   | ● |   |
| V2  |   | ● | ● |     |   |   | ○ |   | ● |   |   | ● |   |
| V3  | ● |   |   | (○) |   |   | ○ |   | ● |   |   | ● |   |
| V4  |   | ● |   |     | ● |   |   | ● |   | ○ |   | ● |   |
| V5  |   | ● | ● |     |   |   |   | ● |   | ○ |   | ● |   |
| V6  | ● |   |   | (○) |   |   |   | ● |   | ○ |   | ● |   |
| V7  |   | ● |   | ○   |   | ● |   |   |   | ○ |   | ● |   |
| V8  | ● |   | ● |     |   | ● |   |   |   | ○ |   | ● |   |
| V9  | ● |   |   |     | ● | ● |   |   |   | ○ |   | ● |   |
| V10 |   | ● |   |     | ● |   | ○ |   | ● |   |   |   | ● |
| V11 |   | ● | ● |     |   |   | ○ |   | ● |   |   |   | ● |
| V12 | ● |   |   | (○) |   |   | ○ |   | ● |   |   |   | ● |
| V13 |   | ● |   |     | ● |   |   | ● |   | ○ |   |   | ● |
| V14 |   | ● | ● |     |   |   |   | ● |   | ○ |   |   | ● |
| V15 | ● |   |   | (○) |   |   |   | ● |   | ○ |   |   | ● |
| V16 |   | ● |   | ○   |   | ● |   |   |   | ○ |   |   | ● |
| V17 | ● |   | ● |     |   | ● |   |   |   | ○ |   |   | ● |
| V18 | ● |   |   |     | ● | ● |   |   |   | ○ |   |   | ● |
| R1  |   | ● |   |     | ● |   | ○ |   |   |   | ● | ● |   |
| R2  |   | ● | ● |     |   |   | ○ |   |   |   | ● | ● |   |
| R3  | ● |   |   | (○) |   |   | ○ |   |   |   | ● | ● |   |
| R4  |   | ● |   |     | ● |   | ○ |   |   |   | ● |   | ● |
| R5  |   | ● | ● |     |   |   | ○ |   |   |   | ● |   | ● |
| R6  | ● |   |   | (○) |   |   | ○ |   |   |   | ● |   | ● |

| Gear | S1 | | S2 | | | S3 | | | S4 | | |
|---|---|---|---|---|---|---|---|---|---|---|---|
| | S1l | S1r | S2l | N2 | S2r | S3l | N3 | S3r | S4l | N4 | S4r |
| V1 | ● | | | (○) | | | ○ | | ● | | |
| V2 | | ● | ● | | | | ○ | | ● | | |
| V3 | | ● | | | ● | | ○ | | ● | | |
| V4 | ● | | | (○) | | | | ● | | ○ | |
| V5 | | ● | ● | | | | | ● | | ○ | |
| V6 | | ● | | | ● | | | ● | | ○ | |
| V7 | ● | | ● | | | ● | | | | ○ | |
| V8 | ● | | | | ● | ● | | | | ○ | |
| V9 | | ● | | ○ | | ● | | | | ○ | |
| R1 | ● | | | (○) | | | ○ | | | | ● |
| R2 | | ● | ● | | | | ○ | | | | ● |
| R3 | | ● | | | ● | | ○ | | | | ● |

| Input constant/ gearwheel stage | K1 | K2 | K3 | G2 | G1 | GR |
|---|---|---|---|---|---|---|
| Loose wheel | 48 | 57 | 67 | 97 | 121 | 121 |
| Fixed wheel | 104 | 95 | 85 | 55 | 31 | 31 |
| $i_{individual}$ | 2.167 | 1.667 | 1.269 | 1.764 | 3.903 | -3.903 |

Fig. 17

| Forward gear | V1 | V2 | V3 | V4 | V5 | V6 | V7 | V8 | V9 |
|---|---|---|---|---|---|---|---|---|---|
| Input constant | K1 | K2 | K3 | K1 | K2 | K3 | K1 | K1 | - |
| Gearwheel stage/ second input constant | G1 | G1 | G1 | G2 | G2 | G2 | K3 | K2 | - |
| $i_{overall}$ | 8.46 | 6.51 | 4.95 | 3.82 | 2.94 | 2.24 | 1.71 | 1.3 | 1.00 |
| $\varphi$ | | 1.300 | 1.314 | 1.296 | 1.300 | 1.314 | 1.310 | 1.314 | 1.300 |

Fig. 18

| Gear | S1 | | S2 | | | S3 | | | S4 | | |
|---|---|---|---|---|---|---|---|---|---|---|---|
| | S1l | S1r | S2l | N2 | S2r | S3l | N3 | S3r | S4l | N4 | S4r |
| V1 | ● | | | ○ | | ○ | | | ● | | |
| V2 | | ● | ● | | | ○ | | | ● | | |
| V3 | | ● | | | ● | ○ | | | ● | | |
| V4 | ● | | | ○ | | | | ● | | ○ | |
| V5 | ● | | | | ● | ● | | | | ○ | |
| V6 | | ● | ● | | | | | ● | | ○ | |
| V7 | ● | | ● | | | ● | | | | ○ | |
| V8 | | ● | | | ● | | | ● | | ○ | |
| V9 | | ● | | ○ | | | ● | | | ○ | |
| R1 | ● | | | ○ | | ○ | | | | | ● |
| R2 | | ● | ● | | | ○ | | | | | ● |
| R3 | | ● | | | ● | ○ | | | | | ● |

Fig. 19

| Input constant/ gearwheel stage | K1 | K2 | K3 | G2 | G1 | GR |
|---|---|---|---|---|---|---|
| Loose wheel | 45 | 59 | 74 | 82 | 119 | 119 |
| Fixed wheel | 107 | 93 | 78 | 70 | 33 | 33 |
| $i_{individual}$ | 2.378 | 1.576 | 1.054 | 1.171 | 3.606 | -3.606 |

Fig. 20

| Forward gear | V1 | V2 | V3 | V4 | V5 | V6 | V7 | V8 | V9 |
|---|---|---|---|---|---|---|---|---|---|
| Input constant | K1 | K2 | K3 | K1 | K1 | K2 | K1 | K3 | - |
| Gearwheel stage/ second input constant | G1 | G1 | G1 | G2 | K3 | G2 | K2 | G2 | - |
| $i_{overall}$ | 8.57 | 5.68 | 3.80 | 2.79 | 2.26 | 1.85 | 1.51 | 1.23 | 1.00 |
| $\varphi$ | | 1.508 | 1.495 | 1.365 | 1.235 | 1.222 | 1.224 | 1.222 | 1.235 |

Fig. 21

| Input constant/ gearwheel stage | K1 | K2 | K3 | G2 | G1 | GR |
|---|---|---|---|---|---|---|
| Loose wheel | 44 | 56 | 74 | 80 | 121 | 121 |
| Fixed wheel | 108 | 96 | 78 | 72 | 31 | 31 |
| $i_{individual}$ | 2.455 | 1.714 | 1.054 | 1.171 | 3.903 | -3.903 |

Fig. 22

| Forward gear | V1 | V2 | V3 | V4 | V5 | V6 | V7 | V8 |
|---|---|---|---|---|---|---|---|---|
| Input constant | K1 | K2 | K3 | K1 | K2 | K1 | K3 | - |
| Gearwheel stage/ second input constant | G1 | G1 | G1 | G2 | G2 | K2 | G2 | - |
| $i_{overall}$ | 8.57 | 5.68 | 3.80 | 2.79 | 1.85 | 1.51 | 1.23 | 1.00 |
| $\varphi$ | | 1.432 | 1.626 | 1.509 | 1.432 | 1.330 | 1.223 | 1.171 |

Fig. 23

| Forward gear | V1 | V2 | V3 | V4 | V4b | V5 | V6 | V7 | V8 |
|---|---|---|---|---|---|---|---|---|---|
| Input constant | K1 | K2 | K3 | K1 | K1 | K2 | K1 | K3 | - |
| Gearwheel stage/ second input constant | G1 | G1 | G1 | G2 | K3 | G2 | K2 | G2 | - |
| $i_{overall}$ | 8.57 | 5.68 | 3.80 | 2.79 | 2.33 | 1.85 | 1.51 | 1.23 | 1.00 |
| $\varphi$ | | 1.432 | 1.626 | 1.509 | 1.171 | 1.223 | 1.330 | 1.223 | 1.171 |

Fig. 24

| Input constant/ gearwheel stage | K1 | K2 | K3 | G2 | G1 | GR |
|---|---|---|---|---|---|---|
| Loose wheel | 45 | 63 | 78 | 71 | 121 | 121 |
| Fixed wheel | 107 | 89 | 74 | 81 | 31 | 31 |
| $i_{individual}$ | 2.378 | 1.413 | 0.949 | 0.877 | 3.903 | -3.903 |

Fig. 25

| Forward gear | V1 | V2 | V3 | V4 | V5 | V6 | V7 | V8 |
|---|---|---|---|---|---|---|---|---|
| Input constant | K1 | K2 | K3 | K1 | K1 | K | - | K3 |
| Gearwheel stage/ second input constant | G1 | G1 | G1 | K3 | K2 | G2 | - | G2 |
| $i_{overall}$ | 9.28 | 5.51 | 3.70 | 2.51 | 1.68 | 1.24 | 1.00 | 0.83 |
| $\varphi$ | | 1.683 | 1.489 | 1.477 | 1.489 | 1.359 | 1.238 | 1.203 |

Fig. 26

| Forward gear | V1 | V2 | V3 | V4 | V4b | V5 | V6 | V7 | V8 |
|---|---|---|---|---|---|---|---|---|---|
| Input constant | K1 | K2 | K3 | K1 | K1 | K1 | K | - | K3 |
| Gearwheel stage/ second input constant | G1 | G1 | G1 | K3 | G2 | K2 | G2 | - | G2 |
| $i_{overall}$ | 9.28 | 5.51 | 3.70 | 2.51 | 2.08 | 1.68 | 1.24 | 1.00 | 0.83 |
| $\varphi$ | | 1.683 | 1.489 | 1.477 | 1.203 | 1.238 | 1.359 | 1.238 | 1.203 |

Fig. 29

| Gear | S1 | | S2 | | | S3 | | | S4 | | | S5 | |
|---|---|---|---|---|---|---|---|---|---|---|---|---|---|
| | S1l | S1r | S2l | N2 | S2r | S3l | N3 | S3r | S4l | N4 | S4r | S5l | S5r |
| V1 | ● | | | (○) | | | ○ | | ● | | | ● | |
| V2 | | ● | ● | | | | ○ | | ● | | | ● | |
| V3 | | ● | | | ● | | ○ | | ● | | | ● | |
| V4 | ● | | | (○) | | | | ● | | ○ | | ● | |
| V5 | ● | | | | ● | ● | | | | ○ | | ● | |
| V6 | | ● | ● | | | | | ● | | ○ | | ● | |
| V7 | ● | | ● | | | ● | | | | ○ | | ● | |
| V8 | | ● | | | ● | | | ● | | ○ | | ● | |
| V9 | | ● | | (○) | | ● | | | | ○ | | ● | |
| (V10) | | ● | | | ● | | ○ | | ● | | | | ● |
| V11 | ● | | | (○) | | | | ● | | ○ | | | ● |
| V12 | ● | | | | ● | ● | | | | ○ | | | ● |
| V13 | | ● | ● | | | | | ● | | ○ | | | ● |
| V14 | ● | | ● | | | ● | | | | ○ | | | ● |
| V15 | | ● | | | ● | | | ● | | ○ | | | ● |
| V16 | | ● | ● | (○) | | ● | | | | ○ | | | ● |
| R1 | ● | | | (○) | | | ○ | | | | | ● | ● |
| R2 | | ● | ● | | | | ○ | | | | | ● | ● |
| R3 | | ● | | | ● | | ○ | | | | | ● | ● |
| R4 | ● | | | (○) | | | ○ | | | | | ● | ● |
| R5 | | ● | ● | | | | ○ | | | | | ● | ● |
| R6 | | ● | | | ● | | ○ | | | | | ● | ● |

210: V1–V9
211: V10–V16

GROUP TRANSMISSION FOR A MOTOR VEHICLE

This is a Continuation-In-Part application of pending international patent application PCT/EP2007/007235 filed Aug. 16, 2007 and claiming the priority of German patent application 10 2006 038 193.9 filed Aug. 16, 2006.

BACKGROUND OF THE INVENTION

The invention relates, to a motor vehicle group transmission with an input shaft, an intermediate shaft and a main shaft arranged in succession and coaxially with one another and parallel to a countershaft.

Lechner, G., "Fahrzeuggetriebe" ["Vehicle transmissions"], Springer-Verlag, 1994, pages 154 to 158 already discloses the three-group transmission 16 S 109 of the company ZF FRIEDRICHSHAFEN AG and the twin-splitter transmission of the company Eaton.

The three-group transmission 16 S 109 comprises an input shaft, an intermediate shaft and a main shaft. The first two toothed stages are designed as input constants. Here, the drive gearwheel of the first input constant is a loose wheel disposed coaxially on the input shaft. The drive gearwheel of the second input constant is, in contrast, a fixed wheel disposed coaxially on the intermediate shaft. The intermediate shaft can be rotationally fixedly coupled by means of two gearshift clutches to the input shaft and to the main shaft, such that a direct gear is established. With the exception of the gearwheel stage of the reverse gear and the range group, said three-group transmission requires five gearwheel stages to realize sixteen forward gears. Also, the twin-splitter transmission has two countershafts.

DE 102 39 396 A1 relates to a countershaft transmission with a direct gear whose countershaft does not co-rotate when the direct gear is engaged.

U.S. Pat. No. 5,381,703 also relates to a countershaft transmission having an input shaft, an output shaft and a countershaft, with the drive of the countershaft being prevented when the countershaft transmission is in the direct gear.

It is the principal object of the invention to provide a utility vehicle transmission which is relatively short but has a high number of gears.

SUMMARY OF THE INVENTION

In a group transmission having a number of countershafts, wherein at least two input constants are provided on an input shaft for driving a countershaft such that the group transmission is of very short construction, input shaft is connectable to an intermediate shaft for direct power transmission, with the countershaft being disconnectable in the direct gear in order to avoid drag losses.

In the group transmission according to the present invention with one or more countershafts, at least two—in particular three—input constants are provided, whereby the group transmission is of very short construction. The intermediate shaft makes it possible to disconnect the countershaft in the direct gear.

The invention particularly advantageously permits a high number of transmission gears since at least two input constants multiply the number of gear stages which can be established via the rest of the gearwheel stages. These input constants are additionally utilized to form together a forward gear.

In the particularly advantageous embodiment with three input constants, two forward gears are formed by means of the input constants alone. In one of said two forward gears, it is possible for the force flow to run from the one input constant via the countershaft to one of the other two input constants, and subsequently to a main shaft.

The main shaft can be coupled by means of the intermediate shaft to the input shaft, such that a direct gear is formed. The intermediate shaft may particularly advantageously serve to mount the loose wheels of the two rear input constants, while the foremost input constant is mounted so as to be coaxially rotatable on the input shaft. It is even possible to dispense with a radial mounting of the two rear loose wheels if two countershafts are arranged at least approximately diametrically with respect to one another. In this case, specifically, the forces are compensated, such that the intermediate shaft is not subjected to bending. Accordingly, in the case of two countershafts which are arranged diametrically with respect to one another, it is also possible to dispense with radial mounting of the intermediate shaft with respect to the input shaft and the main shaft. Instead of two countershafts which are arranged diametrically with respect to one another, it is also possible for three countershafts to be provided so as to be distributed at least approximately uniformly on the periphery—that is to say with a pitch of 120°. By means of such a distribution of power between two or three countershafts, the loading of the gearwheels is reduced. It is thereby possible for the gearwheels to be designed to be narrower, such that the transmission is of shorter construction. Furthermore, on account of the reduced loading, the countershafts are subjected to less bending. The input shaft, the intermediate shaft and the main shaft are even subjected to practically no bending at all on account of the mutually compensating radial force components from the tooth engagements. It is even possible to dispense with radial mounting of the main shaft, such that the latter is merely guided.

The main shaft may, in one particularly advantageous embodiment, adjoin a range group which can have two shift states, such that
  both the two forward gears via the two input constants,
  and also the direct gear,
  and also three possible reverse gears,
  and also forward gears which run via only one input constant and a further transmission stage,
may in each case form two different gears, such that the total number of gears is doubled. Here, the range group may particularly advantageously be designed as a planetary gear set which
  provides a step-down transmission ratio in the one shift position, and
  rotates as a block in the other shift position, such that the main shaft rotational speed is transmitted, unchanged, to a differential gear.

The design of the planetary gear set in connection with a corresponding design
  of the transmission ratios in the countershaft transmission and
  of the transmission ratio at the rear axle drive
makes it possible for the most-utilized driving range of a utility vehicle, at approximately eighty kilometers per hour, to be located in a direct through drive. In said direct through drive
  the direct gear is engaged,
  the planetary gear set of the range group rotates as a block, and
  the countershaft is decoupled.

The efficiency of the transmission for utility vehicles in the most-utilized driving range for long-distance travel is therefore kept very high. Here, the transmission ratio may be designed such that the drive engine is situated in the most fuel-efficient range. Said most fuel-efficient drive engine rotational speed range lies for example between 1100 and 1500 rpm in the case of 6-cylinder diesel drive engines. Here, the most fuel-efficient drive engine rotational speed range lies more toward 1100 rpm in the case of 6-cylinder diesel drive engines of large swept volume and more toward 1500 rpm in the case of 6-cylinder diesel drive engines of small swept volume.

The stated design of the planetary gear set with a step-down transmission ratio and a direct through drive—that is to say therefore without a step-up transmission ratio—makes it possible to design the rotational speeds in the countershaft transmission to be high and the torque in the countershaft transmission to be low, such that relatively low forces occur in the countershaft transmission. It is thereby possible to dimension the gearwheels to be narrower and
to dimension the transmission housing to have a thin wall.

The countershaft transmission is designed as a coaxial transmission which is particularly advantageously used with drive engines which are installed longitudinally in the vehicle longitudinal direction. In a coaxial countershaft transmission of said type, the input shaft and main shaft are in alignment with one another. The planetary gear set which, in one advantageous embodiment, adjoins the countershaft transmission, may likewise be arranged coaxially here.

Despite the possibility of decoupling the countershaft, the invention permits a high number of gears for a small axial installation space.

The invention will become more readily apparent from the following description thereof on the basis of the accompanying drawings:

BRIEF DESCRIPTION OF THE DRAWINGS

FIG. 4 shows, in a table, the positions of the gearshift clutches for the single fast gear transmission having at least one countershaft, according to FIG. 1 to FIG. 3, FIG. 10 shows, in a table, the positions of the gearshift clutches for the direct gear transmission according to FIG. 8 and FIG. 9, FIG. 13 shows, in a table, the positions of the gearshift clutches for the double fast gear transmission according to FIG. 11 and FIG. 12, FIG. 17 shows, in a table, the overall transmission ratios, which result from the transmission ratios according to FIG. 16 for the individual forward gears, of the group transmission according to FIG. 14, and the geometrically stepped gradations between the forward gears, FIG. 18 shows, similarly to FIG. 15, in a table, the positions of the gearshift clutches for the group transmission according to FIG. 14 if said group transmission is designed as a progressively stepped direct gear transmission, FIG. 19 shows, similarly to FIG. 16, in a table, possible numbers of teeth of the gearwheels of the group transmission according to FIG. 14, with the resulting transmission ratio at each gearwheel pairing being listed, FIG. 20 shows, in a table, the overall transmission ratios, which result from the transmission ratios according to FIG. 19 for the individual forward gears, of the group transmission according to FIG. 14, and the progressively stepped gradations between the forward gears, FIG. 21 shows a table similar to FIG. 19 for one refinement of the group transmission, FIG. 22 shows, similarly to FIG. 20, a table which result from the transmission ratios according to FIG. 21, FIG. 23 shows a table similar to FIG. 22, with an intermediate gear being provided, FIG. 24 shows a table similar to FIG. 21 for a design as a fast gear transmission, FIG. 25 shows a table similar to FIG. 22 for the design according to FIG. 24, FIG. 26 shows a table similar to FIG. 25 with an intermediate gear, FIG. 29 shows, in a table, the positions of the gearshift clutches for the group transmission according to FIG. 27.

DESCRIPTION OF PARTICULAR EMBODIMENTS

Figure 1:
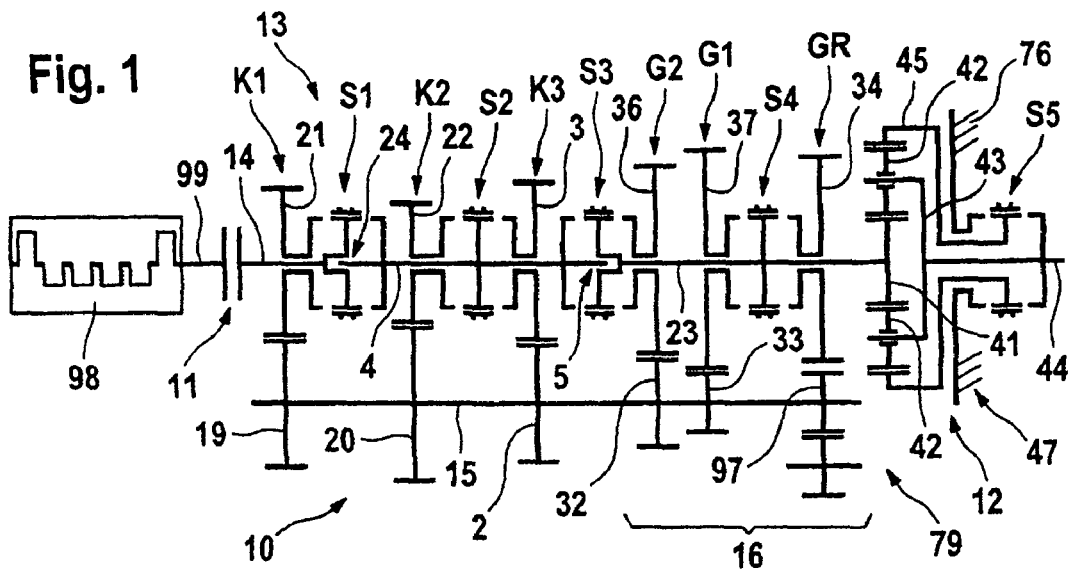
FIG. 1 shows a drivetrain with a group transmission which is designed as a single fast gear transmission and which comprises a countershaft transmission with an intermediate shaft and with a range group which adjoins the countershaft transmission, FIG. 2 schematically shows, on the basis of the forward gears, the force flow in the group transmission according to FIG. 1.

FIG. 1 shows a group transmission 79 for utility vehicles, which group transmission comprises a countershaft transmission 10 with a range group 12 which adjoins said countershaft transmission 10 geometrically and in the power flow. Here, a range group 12 is designed as a planetary gear set.

A crankshaft 99 of the drive engine 98 is adjoined in the force flow by a starting clutch 11 which is followed by said countershaft transmission 10. Said countershaft transmission 10 has a front-mounted group 13, such that a 3-group transmission is provided overall. In the front-mounted group 13, the drive power is transmitted from an input shaft 14, or from an intermediate shaft 4 which is coupled thereto, to a countershaft 15, wherein, depending on the position of four gearshift clutches S1 to S4, the force flow can run via

- a first input constant K1 and one of three gearwheel stages G2, G1, GR of a main group 16, or
- a second input constant K2 and one of three gearwheel stages G2, G1, GR of the main group 16, or
- a third input constant K3 and one of three gearwheel stages G2, G1, GR of the main group 16, or
- the first input constant K1, the second input constant K2 and a direct gear,
- the first input constant K1, the third input constant K3 and a direct gear, or
- the second input constant K2, the third input constant K3 and a direct gear.

The positions of the gearshift clutches S1 to S4 and also of a gearshift clutch S5 of the range group 12 are illustrated here in the table of FIG. 4.

A relatively high number of gears is thereby obtained, since both the second input constant K2 and also the third input constant K3 can be used selectively as a transmission ratio of the main group 16 or as input constants.

Fixed wheels 19, 20, 2 of the input constants K1, K2, K3 are rotationally fixedly connected to the countershaft 15, while the drive gearwheels 21, 22, 3 of the input constants K1, K2, K3 can be rotationally fixedly connected, in each case individually by means of the first two gearshift clutches S1, S2, to the input shaft 14. Here, the first gearshift clutch S1 is arranged axially between the foremost two drive gearwheels 21, 22 of the input constants K1, K2. In contrast, the second gearshift clutch S2 is arranged axially between the two drive gearwheels 22, 3 of the second and third input constants K2, K3.

The input shaft 14 is followed by an intermediate shaft 4 and, subsequently, a main shaft 23 of the main group 16. Here, the input shaft 14, the intermediate shaft 4 and the main shaft 23 are arranged so as to be in alignment with one another and so as to be parallel, and offset, with respect to the countershaft 15. The intermediate shaft 4 is mounted at the front by means of a rolling bearing 24 so as to be rotatable with respect to the input shaft 14 and at the rear by means of a rolling bearing 5 so as to be rotatable with respect to the main shaft 23. Here, said two rolling bearings 24, 5 absorb radial forces and axial forces. The axial forces result from the helical toothing of the gearwheels of the group transmission 79. The radial forces result from the toothing engagement, which seeks to bend the intermediate shaft 4 toward the countershaft 15. When only one countershaft 14 is used, the radial force component is significantly greater than the axial force component. As rolling bearings 24, 5, it is therefore possible to use, for example, deep-groove ball bearings or cylinder-roller bearings.

The gearwheel stages G2, G1 of the forward gears and the gearwheel stage GR of the reverse gear therefore form three gearwheel planes which are assigned in each case to the three transmission constants K1, K2, K3. Here, the third gearshift clutch S3 is arranged in the region of the rear rolling bearing 5, whereas the fourth gearshift clutch S4 is arranged axially between the rearmost gearwheel stages G1, GR of the main group 16.

Drive gearwheels of the gearwheel stages G2, G1 and of the reverse gear stage GR are designed as fixed wheels 32, 33, 97 and are therefore rotationally fixedly connected to the countershaft 15. A drive output gearwheel, which is designed as a loose wheel 36, of the foremost gearwheel stage G2 of the main group 16 can be connected by means of the third gearshift clutch S3 to the main shaft 23. Alternatively, it is possible by means of said third gearshift clutch S3 to produce a rotationally fixed connection between the intermediate shaft 4 and the main shaft 23.

The first gearshift clutch S1, in a first position S1*l*, connects the drive gearwheel 21 to the input shaft 14. In the neutral state illustrated in FIG. 1, the gearshift clutch S1 is decoupled, such that the drive gearwheel 21 and the intermediate shaft 4 are in each case freely rotatable relative to one another and relative to the input shaft 14. In a second position S1*r*, the gearshift clutch S1 connects the intermediate shaft 4 to the input shaft 14. If, at the same time, the third gearshift clutch S3 produces a rotationally fixed connection between the intermediate shaft 4 and the main shaft 23, then the direct gear in the countershaft transmission 10 is engaged, with the countershaft 15 not being driven by means of a gearwheel pairing. At most, a small amount of drive is imparted to the countershaft 15 in the direct gear as a result of the bearing friction of the loose wheels 36, 37 or of the drive wheels 21, 22, 3 which are designed as loose wheels, which drive is negligible in terms of the overall efficiency of the utility vehicle transmission. Said drive of the countershaft 15, which rotates partially in oil, is also referred to as a splashing loss.

The second gearshift clutch S2, in a first position S2*l*, connects the drive gearwheel 22 to the intermediate shaft 4. In the neutral state N2 of the second gearshift clutch S2 as depicted in FIG. 1, the drive gearwheels 22, 3 are freely rotatable relative to one another and relative to the intermediate shaft 4. In a second position S2*r*, the intermediate shaft 4 is rotationally fixedly connected by means of the second gearshift clutch S2 to the drive gearwheel 3.

In a first position S3*l*, the third gearshift clutch S3 rotationally fixedly connects the intermediate shaft 4 to the main shaft 23. In the neutral state N3 of the third gearshift clutch S3 as illustrated in FIG. 1, the drive gearwheel 3 and the loose wheel 36 are rotatable relative to one another, relative to the intermediate shaft 4 and relative to the main shaft 23. In a second position S3*r*, said third gearshift clutch S3 rotationally fixedly connects the loose wheel 36 to the main shaft 23.

The fourth gearshift clutch S4 can likewise be moved into three positions, of which one is the neutral state N4. In a foremost position, said fourth gearshift clutch S4 produces a rotationally fixed connection between the loose wheel 37 and the main shaft 23. In a rear position S4*r*, a rotationally fixed connection is produced between the loose wheel 34 and the main shaft 23.

The range group 12 has a sun gear 41 which is rotationally fixedly connected to the main shaft 23. Furthermore, the range group 12 has a plurality of planets 42 which are mounted so as to be rotatable relative to a web 43 which is rotationally fixedly connected to the transmission output shaft 44. Furthermore, the range group 12 has a ring gear 45.

By means of the fifth gearshift clutch S5, in a first position S5*l*, the main shaft 23 is rotationally fixedly connected to the ring gear 45. That is to say, the range group 12 rotates as a block, such that the rotational speed of the main shaft 23 is transmitted, unchanged, to the transmission output shaft 44. In a central, neutral state, the main shaft 23 and the ring gear 45 are not coupled to one another by means of the fifth gearshift clutch S5. That is to say, the range group 12 is shifted into the neutral state and does not transmit power to the transmission output shaft 44. In a second position S5*r*, the gearshift clutch S5 connects the ring gear 45 to a transmission housing 47, such that the rotational speed of the main shaft 23 is stepped down in terms of transmission ratio, with an increase in torque.

The transmission output shaft 44 is adjoined by a differential gear 78 which has a transmission ratio stage. Said transmission ratio stage is designed such that,
when the direct gear is engaged,
when the planetary gear set rotates as a block and
at a vehicle speed of eighty kilometers per hour,
the drive engine, which is for example designed as a 6-cylinder diesel engine, has a rotational speed of between 1100 and 1500 rpm.

The utility vehicle transmission has eighteen forward gears V1 to V18 and six reverse gears R1 to R6. To realize six forward gears, it is possible for each of the three input constants K1, K2, K3 to be followed in the force flow by one of the gearwheel stages G2, G1, GR of the main group 16. To realize a further forward gear, the first input constant K1 can be followed by the second input constant K2 as a transmission ratio stage. To realize yet another forward gear, the first input constant K1 can be followed by the third input constant K3 as a transmission ratio stage. Said third input constant K3 may also follow the second input constant K2 to realize a further forward gear. A further forward gear is formed by the direct gear. The total of nine forward gears is adjoined by the range group 12 which permits, firstly, a direct through drive to the transmission output shaft 44 and, secondly, a step-down transmission ratio, such that the said eighteen forward gears V1 to V18 are formed overall. The six reverse gears GR are generated in that the one reverse gear stage GR can be combined with the three input constants K1, K2, K3 to form three reverse gears which can be transmitted to the transmission output shaft 44 by means of the range group 12 either directly or alternatively via the step-down transmission ratio.

If the range group 12 is also counted as a gearwheel plane, then said utility vehicle transmission makes do with a total of seven gearwheel planes to realize the above-stated number of gears, even though, as an additional function, the countershaft can also be decoupled in the two direct gears V8 and V17. For this purpose, in the direct gear, the loose wheels are rotatable relative to the input shaft 14 or the intermediate shaft 4 or the main shaft 23, such that, aside from splashing losses, the countershaft 15 can rotate freely.

A partition 76 which is fixed to the transmission housing is situated between the planetary gear set of the range group 12 and the gearshift clutch S5 of the range group 12. Here, the planetary gear set is situated on that side of the partition 76 which faces toward the countershaft transmission 10, whereas the gearshift clutch S5 is situated on the opposite side—that is to say at the rear.

Figure 2:
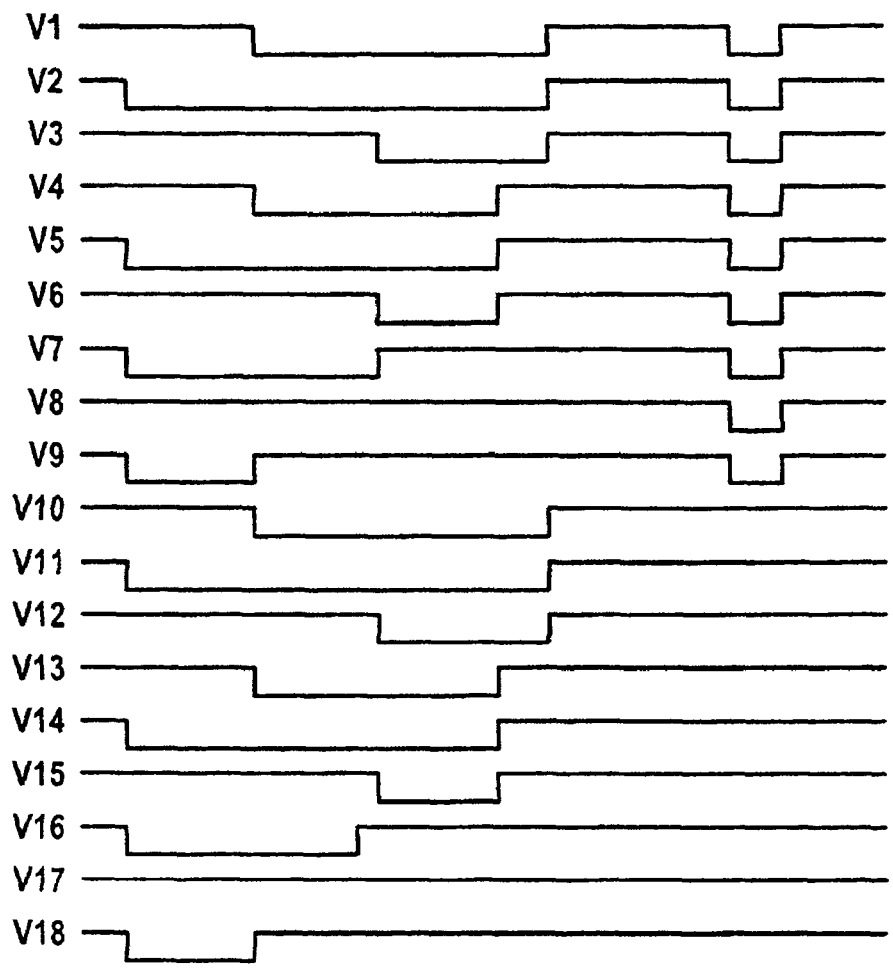

FIG. 2 schematically shows, on the basis of the forward gears V1 to V18, the force flow in the group transmission 79 when the gearshift clutches S1 to S5 are engaged corresponding to the table of FIG. 4. Here, it can also be seen that the group transmission is designed as a single fast gear transmission.

In the first forward gear V1, the force flow runs from the second input constant K2 via the gearwheel stage G1, with the range group 12 providing a step-down transmission ratio.

In the second forward gear V2, the force flow runs from the first input constant K1 via the gearwheel stage G1, with the range group 12 providing a step-down transmission ratio.

In the third forward gear V3, the force flow runs from the third input constant K3 via the gearwheel stage G1, with the range group 12 providing a step-down transmission ratio.

In the fourth forward gear V4, the force flow runs from the second input constant K2 via the gearwheel stage G2, with the range group 12 providing a step-down transmission ratio.

In the fifth forward gear V5, the force flow runs from the first input constant K1 via the gearwheel stage G2, with the range group 12 providing a step-down transmission ratio.

In the sixth forward gear V6, the force flow runs from the third input constant K3 via the gearwheel stage G2, with the range group 12 providing a step-down transmission ratio.

In the seventh forward gear V7, the force flow runs from the first input constant K1 via the third input constant K3, with the range group 12 providing a step-down transmission ratio.

In the eighth forward gear V8, the force flow runs as a direct gear, with the range group 12 providing a step-down transmission ratio.

In the ninth forward gear V9, the force flow runs from the first input constant K1 via the second input constant K2, with the range group 12 providing a step-down transmission ratio.

The following nine forward gears V10 to V18 are of analogous configuration to the first nine forward gears, but with the fifth gearshift clutch S5 being not in the forward position S5*l* but rather in the rear position S5*r*. In detail, this means:

In the tenth forward gear V10, the force flow runs from the second input constant K2 via the gearwheel stage G1, with the range group 12 transmitting the force flow through with a 1:1 transmission ratio.

In the eleventh forward gear V11, the force flow runs from the first input constant K1 via the gearwheel stage G1, with the range group 12 transmitting the force flow through with a 1:1 transmission ratio.

In the twelfth forward gear V12, the force flow runs from the third input constant K3 via the gearwheel stage G1, with the range group 12 transmitting the force flow through with a 1:1 transmission ratio.

In the thirteenth forward gear V13, the force flow runs from the second input constant K2 via the gearwheel stage G2, with the range group 12 transmitting the force flow through with a 1:1 transmission ratio.

In the fourteenth forward gear V14, the force flow runs from the first input constant K1 via the gearwheel stage G2, with the range group 12 transmitting the force flow through with a 1:1 transmission ratio.

In the fifteenth forward gear V15, the force flow runs from the third input constant K3 via the gearwheel stage G2, with the range group 12 transmitting the force flow through with a 1:1 transmission ratio.

In the sixteenth forward gear V16, the force flow runs from the first input constant K1 via the third input constant K3, with the range group 12 transmitting the force flow through with a 1:1 transmission ratio.

In the seventeenth forward gear V17, the force flow runs as a direct gear, with the range group 12 transmitting the force flow through with a 1:1 transmission ratio.

In the eighteenth forward gear V18, the force flow runs from the first input constant K1 via the second input constant K2, with the range group 12 transmitting the force flow through with a 1:1 transmission ratio.

Here, the group transmission 79 has a relatively low number of gearshift clutches S1 to S4, since all the gearshift clutches are double-acting. The neutral state of the rearmost gearshift clutch S5 illustrated in FIG. 1 is not necessary here for the shifts, as a result of which it is even possible, as per the table of FIG. 4, to dispense with a neutral position of said type.

In the direct gear, the countershaft 15 can be decoupled from the input shaft 14, from the intermediate shaft 4 and from the main shaft 23. For decoupling, the gearshift clutch S2 is placed into the neutral state N2. To engage the direct gear, the first gearshift clutch S1 is situated in the rear position S1*r* and the third gearshift clutch S3 is situated in the forward position S3*l*, with the fourth gearshift clutch S4 being situated in the rear position S4*r*.

The foremost gearshift clutch S1 need not be held in the neutral position in any gear, such that—like the gearshift clutch S5 of the range group 12—said gearshift clutch S1 can be actuated by means of a two-position cylinder. The remaining gearshift clutches require actuation by means of a three-position cylinder.

From FIG. 1, FIG. 2 and FIG. 4, it can be seen that a conventional manual shift device with a manual shift lever would form an atypical shift pattern, for which reason the group transmission 79 is of fully-automated or partially-automated design, with the signal transmission and the shift force transmission therefore taking place electrically, hydraulically, pneumatically or optically or optoelectronically, which is conventionally also referred to as "shift by wire".

Figure 3:
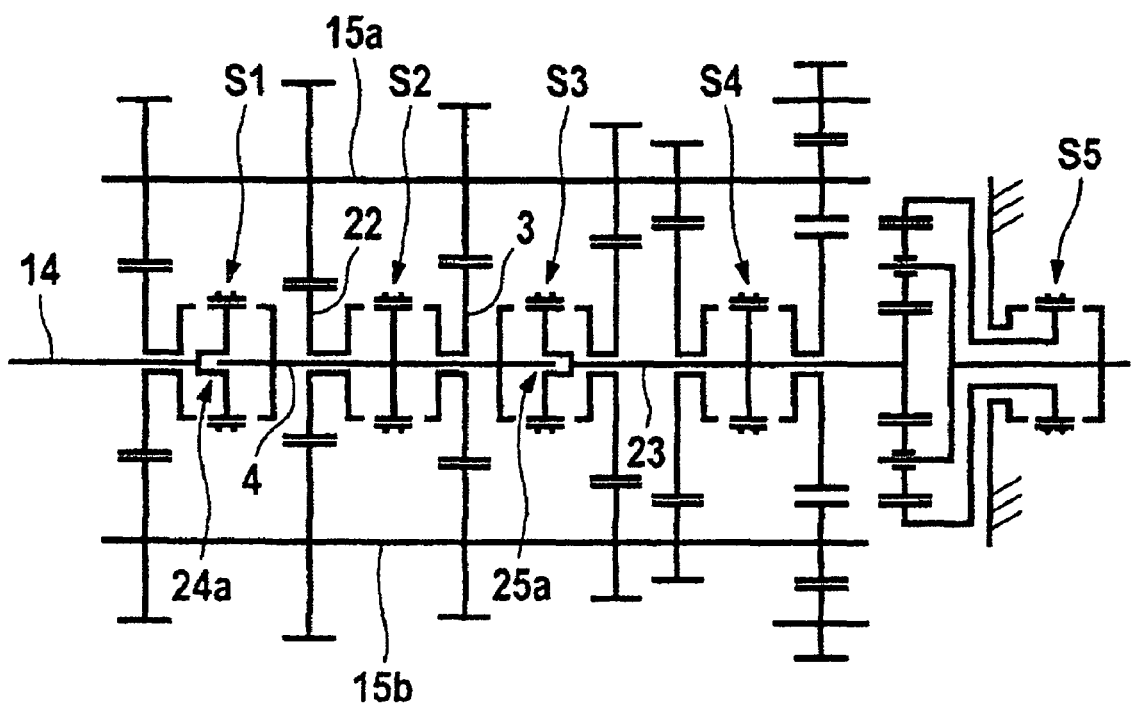
FIG. 3 shows an alternative embodiment of the group transmission according to FIG. 1 and FIG. 2 having two countershafts.

FIG. 3 shows a refinement of the group transmission shown in FIG. 1, with two countershafts 15*a* and 15*b* being provided according to FIG. 3. Here, all the gearshift clutches S1 to S5 are arranged coaxially with respect to the input shaft 14, with respect to the intermediate shaft 4 and with respect to the main shaft 23. Here, the transmission concept is well suited to embodiments with a plurality of countershafts, since the number of gearshift clutches S1 to S5 is independent of the number of countershafts. That is to say, no gearshift clutches are provided coaxially with respect to the countershaft 15 or with respect to the countershafts 15*a*, 15*b*. The use of a plurality of—in particular two or three—countershafts 15*a* and 15*b* is particularly advantageous here. For example, in the case of only one countershaft 15, the radial mounting of the shafts—in particular of the intermediate shaft 4 which is arranged between the input shaft 14 and the main shaft 23—is relatively complex. It may thus be necessary under some circumstances to provide a housing intermediate wall in a group transmission 79 according to FIG. 1, which housing intermediate wall supports the intermediate shaft 4 by means of an additional bearing point. Since the radial forces at the toothing engagements are compensated when two countershafts are arranged diametrically with respect to one another corresponding to FIG. 3, it is possible in this case to dispense with radial mounting of the intermediate shaft 4. However, since the toothings may be designed as helical toothings in order to improve running smoothness, an axial force is introduced into the intermediate shaft 4 at the toothing engagements. Accordingly, axial bearings are required for mounting the intermediate shaft 4 in particular when using helically-toothed gearwheels. However, it is possible even in the case of a straight toothing to provide axial bearings for mounting the shafts relative to one another, such that the shafts are held in their respective positions.

Figure 5:
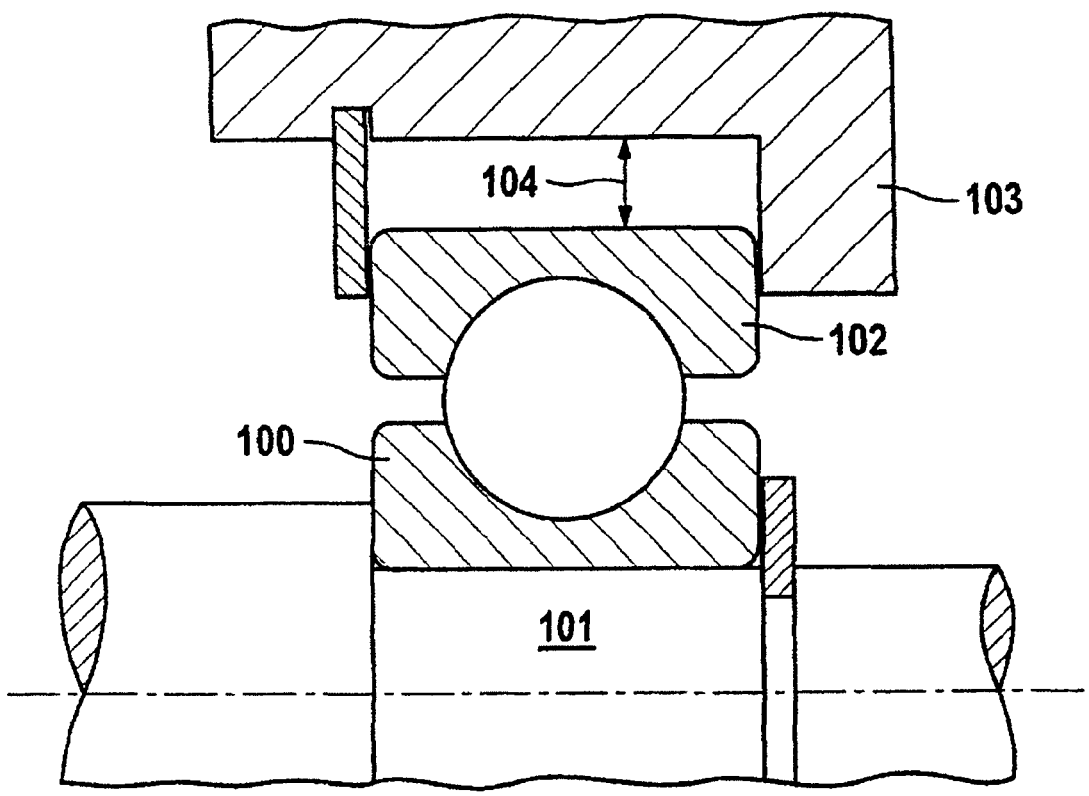
FIG. 5 shows a rolling bearing which is used in the region of an intermediate shaft of a group transmission having at least two countershafts, such as is illustrated by way of example in FIG. 3 and FIG. 7.

The intermediate shaft 4 is likewise acted on with radial forces as a result of vibrations of the vehicle, in particular when driving off-road or during intense braking or acceleration processes or during extreme cornering maneuvers. For this reason, to mount the intermediate shaft 4, it is possible to provide at least one rolling bearing which does not support any radial forces up to a defined radial deflection and which has a supporting function only from said defined deflection onward. FIG. 5 schematically shows a rolling bearing of said type, which may for example be designed as one of the rolling bearings 24*a* or 25*a* for mounting the intermediate shaft 4 at both sides, as per FIG. 3. In addition or alternatively, the drive gearwheels 22, 3 which are arranged so as to be rotatable and coaxial with respect to the intermediate shaft 4 as per FIG. 3 may be designed with said rolling bearing. The rolling bearing according to FIG. 5 is designed as a deep-groove ball bearing. Said rolling bearing could however also be designed as a cylinder-roller bearing or as a tapered-roller bearing. Here, the bearing inner ring 100 is supported axially with respect to the respective shaft 101, which may in particular be the intermediate shaft 4 according to FIG. 3. Likewise, the bearing outer ring 102 is supported axially with respect to the outer body 103, which may be designed as a loose wheel, as a housing or as another shaft. The bearing inner ring 100 is supported, by means of a fit radially at the inside, on the shaft 101. In contrast, the bearing outer ring 102 has, radially at the outside, a degree of play 104. Under normal driving conditions, the shaft 101 with the rolling bearing is centered. If the outer body 103 is another shaft, then the latter is supported with respect to the transmission housing by means of further rolling bearings. In contrast, if the outer body 103 is a loose wheel, then the latter is supported radially on the toothings of the countershafts. In the case of two countershafts, the latter must be arranged diametrically with respect to one another. In the case of three countershafts, the latter should be distributed uniformly about the periphery to a certain extent. If the vibrations mentioned in the introduction now occur, then the play 104 is eliminated and the bearing outer ring 102 abuts against the outer body 103. The shaft 101 is subsequently centered again. Alternatively, instead of the radially outer play 104, the bearing inner ring 100 may have a radially inner degree of play. A combination of radially outer play and radially inner play is also possible. Furthermore, instead of the play 104, it is also possible to provide radial play in the rolling bearing itself—that is to say at the rolling bodies.

As an alternative to the design according to FIG. 5, it is also possible to use a rolling bearing which can absorb very large axial forces and only relatively small or practically no radial forces. A rolling bearing of said type may for example be a deep-groove ball bearing or an axial needle bearing. Here, the rolling bearing may be designed such that it can absorb axial forces to at least twice the magnitude as it can radial forces. Even more extreme designs are also possible. For example, the rolling bearing may be designed such that it can absorb axial forces to at least nine times the magnitude as it can radial forces.

Figure 6:
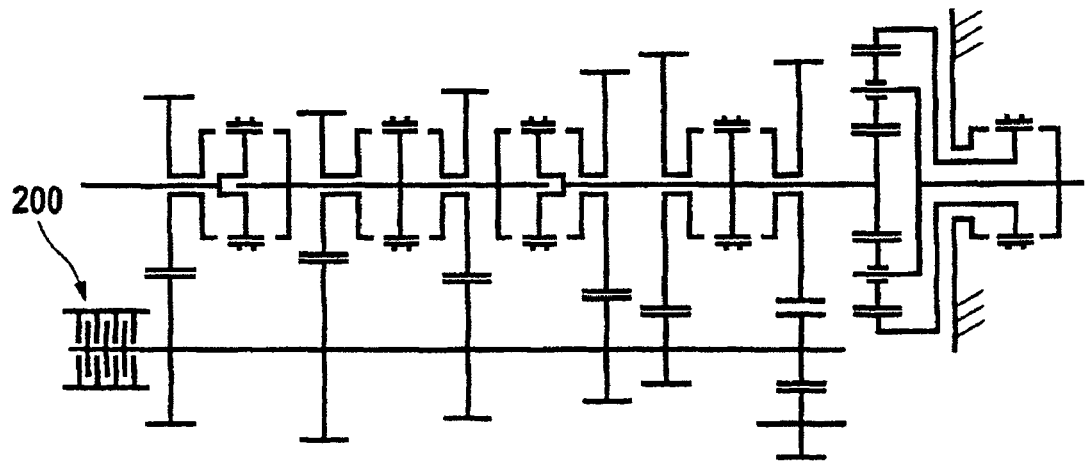
FIG. 6 shows a refinement of the group transmission according to FIG. 1, with a countershaft brake being provided.

The group transmission may alternatively be designed as a synchronous transmission or claw-type transmission. Here, claw-type transmissions are also to be understood to mean transmissions in which only some of the gearshift clutches are formed by means of pure claw clutches while other gearshift clutches may by all means be of synchronized design. In one exemplary embodiment as a claw-type transmission, only the two gearshift clutches S3 and S4 are designed as pure claw-type clutches. In contrast, the first two gearshift clutches S1 and S2 are formed with synchronizing elements, since said gearshift clutches S1 and S2 constitute the front-mounted group. If the third gearshift clutch S3 is situated in the forward position S3*l*, said third gearshift clutch S3 also belongs, in principle, to the front-mounted group. Assuming sequential shifting, however, said position S3*l* need be engaged only during the transition from the sixth forward gear V6 to the seventh forward gear V7 and, analogously, from the fifteenth forward gear V15 to the sixteenth forward gear V16. For the forward gears V8 and V9 and also V17 and V18, the third gearshift clutch S3 remains in the forward position S3*l*. Before said engagement of the third gearshift clutch S3 in the forward direction, the latter is therefore situated, in the case of sequential shifting, in the rear position S3*r*. To pass from said position S3*r* into the forward position S3*l*, the third gearshift clutch S3 is passed through the neutral state N3. In said neutral state N3, the main group 16 is likewise shifted into a neutral state, such that, when passing through the neutral state N3, there is no operative connection between the intermediate shaft 4 and the transmission output shaft 44. Here, when passing through the neutral state, a rotational speed adaptation is carried out by accelerating the drive engine. Alternatively or in addition, it is also possible, according to FIG. 6 or FIG. 7, for the countershaft to be braked by means of a countershaft brake 200 or 300.

As an alternative to said acceleration by means of a drive engine or to braking by means of a countershaft brake 200 or 300, it is also possible for the third gearshift clutch S3 to be designed as a "mixed" gearshift clutch. Said "mixed" gearshift clutch has conical synchronizing elements at the front, whereas the other side has no synchronizing elements.

Figure 7:
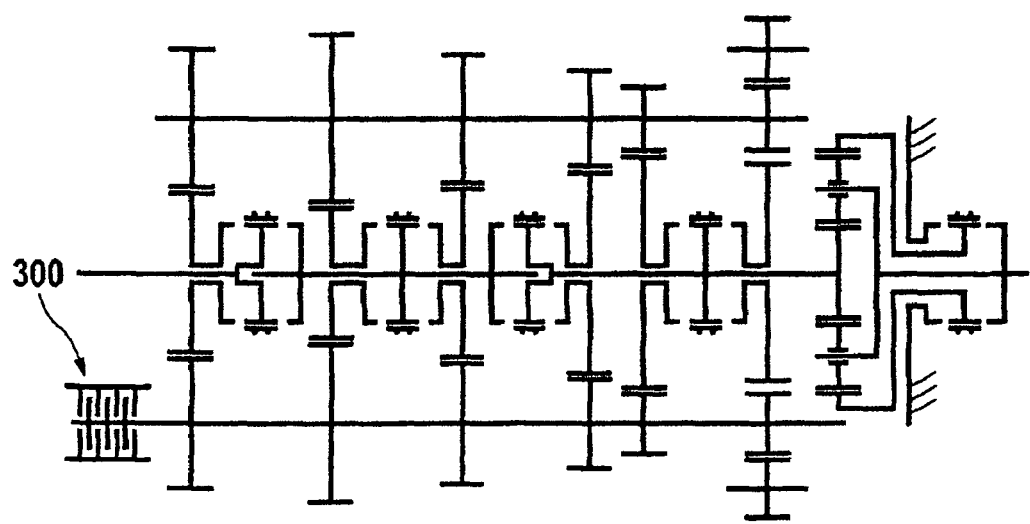
FIG. 7 shows a refinement of the group transmission illustrated in FIG. 3 having two countershafts, with a countershaft brake being provided only on the one countershaft.

In an embodiment with a plurality of countershafts, the rotational speed adaptation during the upshift process takes place, corresponding to FIG. 7, by means of a single countershaft brake which is correspondingly assigned to only one of the countershafts. In an alternative embodiment which is not illustrated in the drawing, it is also possible for each countershaft to be formed with a separate countershaft brake.

Figure 8:
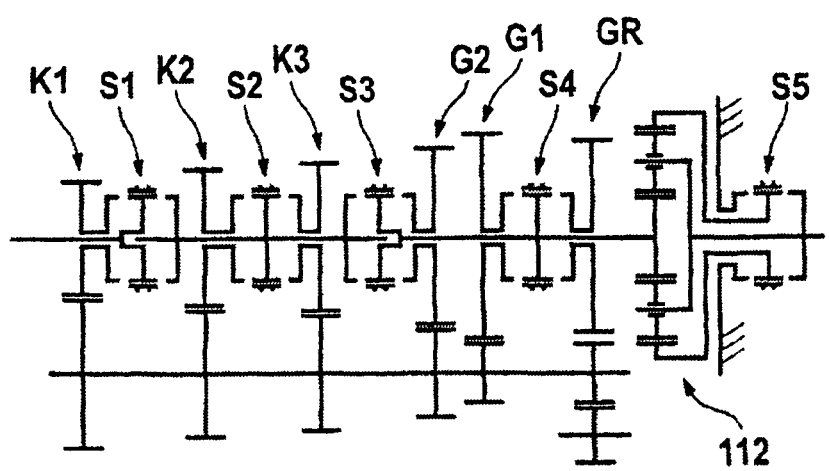
FIG. 8 shows an alternative embodiment of the group transmission according to FIG. 1 as a direct gear transmission, FIG. 9 schematically shows, on the basis of the forward gears, the force flow in the direct gear transmission according to FIG. 8.
Figure 9:
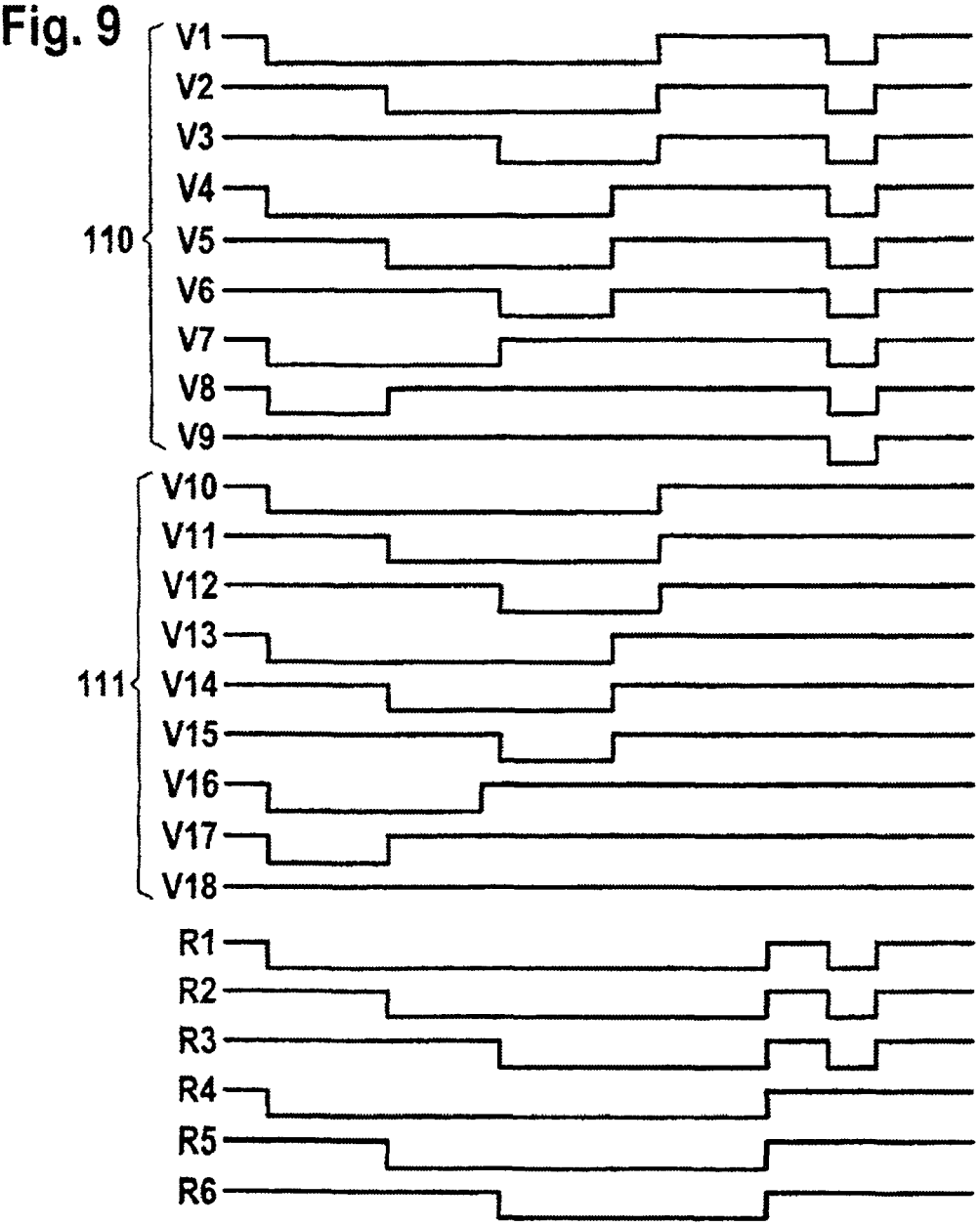

FIGS. 8 to 10 show a further embodiment of the group transmission with three input constants K1 to K3 and an additional range group 112.

In said embodiment, it is fundamentally possible to provide gradations which are approximately equal throughout, so as to generate the geometric stepping explained in more detail further below. In the illustrated arrangement, the result is then eighteen forward gears V1 to V18 and six reverse gears R1 to R6.

Alternatively, said group transmission may also be realized with fifteen forward gears. Said alternative variant is illustrated in the table of FIG. 10 by means of the forward gears V10 to V12 which are shown in brackets. Therefore, in relation to the variant with eighteen forward gears, the first three forward gears V10, V11 and V12 in an upper group 111 are omitted, such that nine forward gears V1 to V9 are available from a lower group 110 and six forward gears V13 to V18 are available from the upper group 111. The central gearwheel stage G1 is then used only in the three lowest forward gears V1, V2, V3 of the lower group 110, such that the gearwheel stage G1 may, on account of the small proportion of time for which it is utilized, be designed to be narrower than in the variant with eighteen forward gears. The first three forward gears V1 to V3 are therefore creep gears. The respective transmission ratios or numbers of teeth of the input constants K1, K2, K3 and of the gearwheel stages G1, G2, GR may, in principle, be designed to be the same in the variant with eighteen forward gears as in the variant with fifteen forward gears. By means of a relatively long transmission ratio of the range group 112, it is possible to ensure that, in the variant with fifteen forward gears, there is a gradation between the ninth forward gear V9—that is to say the highest forward gear of the lower group 110—and the tenth forward gear V10—that is to say the lowest forward gear of the upper group 111—which is equal in magnitude to a gradation between two adjacent forward gears within the same group 110 or 111.

Alternatively, the two variants with fifteen and eighteen forward gears may also be designed as fast gear transmissions. In a fast gear transmission of said type—explained in more detail with regard to FIG. 11 to FIG. 13 and FIG. 18 to FIG. 23—the highest forward gear has a transmission ratio of i<1.

Figure 11:
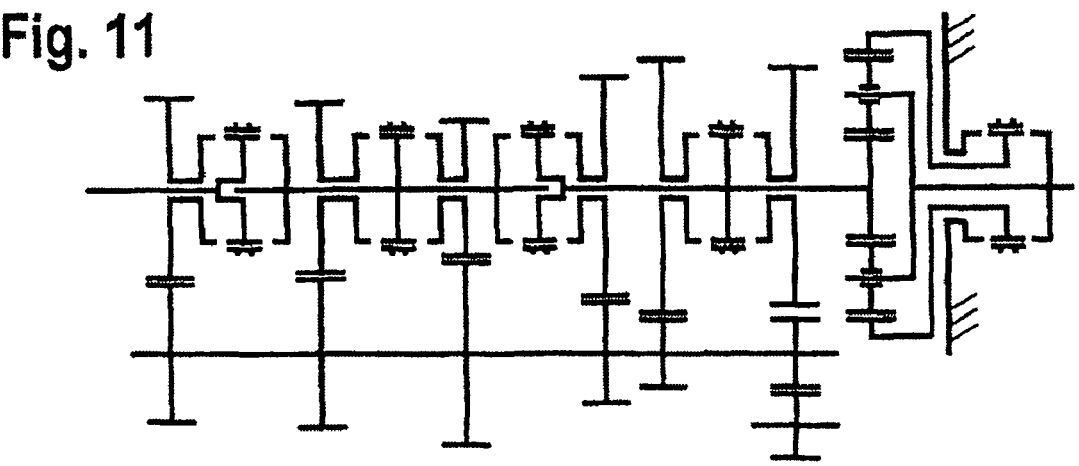
FIG. 11 shows an alternative embodiment of the group transmission according to FIG. 1 as a double fast gear transmission, FIG. 12 schematically shows, on the basis of the forward gears, the force flow in the double fast gear transmission according to FIG. 11.
Figure 12:
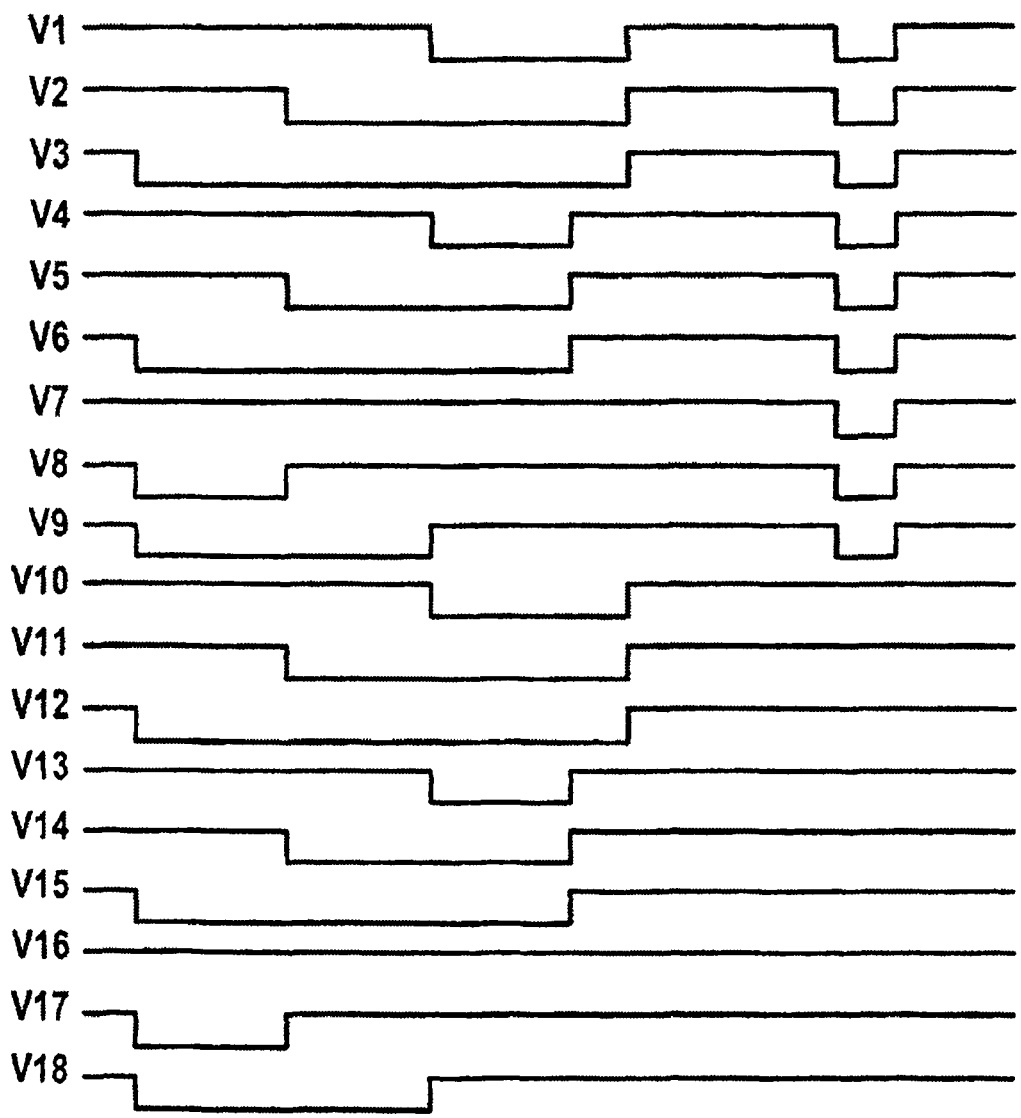

FIGS. 11 to 13 show, analogously to FIGS. 8 to 10, a group transmission which is however designed as a double fast gear transmission. Here, the two highest forward gears V17 and V18 have a transmission ratio of i<1. To arrange said two forward gears V17 and V18 above the direct gear, the other forward gears are also partially modified in relation to the preceding exemplary embodiments, as can be seen from the force flows according to FIG. 12 and the table according to FIG. 13.

Figures 14, 15, 16:
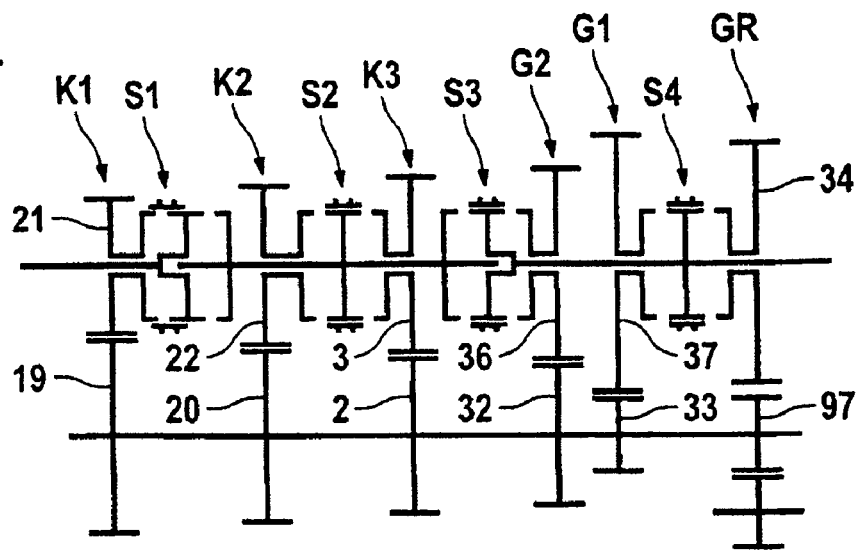
FIG. 14 shows an alternative embodiment of the group transmission according to FIG. 8, without a range group.
FIG. 15 shows, in a table, the positions of the gearshift clutches for the group transmission according to FIG. 14 if said group transmission is designed as a geometrically stepped direct gear transmission.
FIG. 16 shows, in a table, possible numbers of teeth of the gearwheels of the group transmission according to FIG. 14 and FIG. 15, with the resulting transmission ratio at each gearwheel pairing being listed.

FIG. 14 shows an alternative embodiment of a group transmission, which is designed as a direct gear transmission, according to FIG. 8, but with no range group being provided. Accordingly, identical components are provided with the same reference symbols as those provided in FIG. 8.

In this regard, FIG. 15 shows a table of the positions S1l to S4r of the gearshift clutches S1 to S4 for the group transmission according to FIG. 14. From a comparison of the table of FIG. 15 with the table of FIG. 10, it can be seen that the gears V1 to V9 and R1 to R3 of the group transmission according to FIG. 14 correspond to the gears V1 to V19 and R1 to R3 of the group transmission according to FIG. 8 if the functionality of the range group and therefore of the gearshift clutch S5 is omitted.

FIG. 16 shows a table of possible numbers of teeth of the loose wheels and of the fixed wheels of the group transmission according to FIG. 14, with the lowest row listing the individual transmission ratio $i_{individual}$ resulting from each gearwheel pairing.

In the case of the first input constant K1, the loose wheel is the drive gearwheel 21 and the fixed wheel is the fixed wheel 19.

In the case of the second input constant K2, the loose wheel is the drive gearwheel 22 and the fixed wheel is the fixed wheel 20.

In the case of the third input constant K3, the loose wheel is the drive gearwheel 3 and the fixed wheel is the fixed wheel 2.

In the case of the foremost gearwheel stage G2, the loose wheel is the loose wheel 36 and the fixed wheel is the fixed wheel 32.

In the case of the central gearwheel stage G1, the loose wheel is the loose wheel 37 and the fixed wheel is the fixed wheel 33.

In the case of the gearwheel stage GR which is assigned to the reverse gear, the loose wheel is the loose wheel 34 and the fixed wheel is the fixed wheel 97.

FIG. 17 shows a table of the overall transmission ratios $i_{overall}$ of the group transmission according to FIG. 14 which result from the transmission ratios i according to FIG. 16 for the individual forward gears V1 to V9. The lowest row lists the gradation φ between two forward gears V1-V2 or V2-V3 or V3-V4 or V4-V5 or V5-V6 or V6-V7 or V7-V8 or V8-V9. Here, it is possible to clearly see the geometric gear stepping of the gradations φ. As is known, said geometric gear stepping is in contrast to progressive gear stepping. A characterizing feature of said geometric configuration of the group transmission according to FIG. 14 is that all the forward gears V4 to V6, which are formed by means of the forward gear stage G2, are in direct succession to one another in exactly the same way as those forward gears V1 to V3 which are formed by means of the central gearwheel pair G1. Accordingly, for the gradations φ, it is true that:

$$\phi_{V1\text{-}V2}=\phi_{V4\text{-}V5} \text{ and } \phi_{V2\text{-}V3}=\phi_{V5\text{-}V6}.$$

The gradation $\phi_{V3\text{-}V4}$ between the third forward gear V3 and the fourth forward gear V4 may be freely selected. The gradation $\phi_{V7\text{-}V8}$ is determined by the ratio of the transmission ratios of the second and third input constants K2 and K3. It is therefore also true that:

$$\phi_{V2\text{-}V3}=\phi_{V5\text{-}V6}=\phi_{V7\text{-}V8}.$$

The gradation φ between the forward gear V9, which is designed as a direct gear, and the eighth forward gear V8 is in turn dependent on the ratio of the transmission ratios of the two first input constants K1 and K2, so as to result in a further dependency:

$$\phi_{V1-V2} = \phi_{V4-V5} = \phi_{V8-V9}.$$

If the forward gears are formed in the manner described above, there is the disadvantage that the gradations φ between relatively high forward gears are smaller than the gradations φ between relatively low forward gears, such that the most desirable progressive gear stepping is not obtained.

Said problem may however be overcome by virtue of the forward gears being formed according to a different basic principle. The essence of said principle is that the forward gears which are formed by means of the foremost gearwheel stage G2 are not all in direct succession to one another. As can be seen in FIG. 18, for this purpose, the sequence of the engaged gearshift clutches S1 to S4 is modified. Furthermore, different numbers of teeth are ideal for said different principle, as are shown in FIG. 19.

In this regard, FIG. 18 shows a table of the positions S1 to S4r of the gearshift clutches S1 to S4 for the group transmission, which is designed with quasi-progressive gear stepping, according to claim 14. Below, an explanation is given only of the differences in relation to the table as per FIG. 15. The fifth forward gear V5 shifted in an identical manner to the eighth forward gear V8 from FIG. 15. The eighth forward gear V8 is shifted in an identical manner to the sixth forward gear V6 from FIG. 15.

FIG. 19 corresponds to FIG. 16, but with different numbers of teeth and consequently different individual transmission ratios $i_{individual}$ being provided. Said individual transmission ratios $i_{individual}$ result, analogously to FIG. 16, in the gradations φ illustrated in FIG. 20. In contrast to the design according to FIG. 15 to FIG. 17, the following boundary conditions now apply:

$$\phi_{V1-V2} = \phi_{V4-V6} \text{ and } \phi_{V2-V3} = \phi_{V6V-V8}.$$

As can be seen from the table of FIG. 20, the following conditions also apply:

$$\phi_{V4-V5} = \phi_{V8-V9} \text{ and } \phi_{V5-V6} = \phi_{V7-V8}.$$

Highly expedient gear stepping is provided in said embodiment if three groups of gradations φ of approximately equal magnitude are formed:

$$\phi_{V4-V5} \approx \phi_{V5-V6} \approx \phi_{V6-V7} \approx \phi_{V7-V8} \approx \phi_{V8-V9} = x$$

$$x \leq \phi_{V3-V4} \leq x^2; \text{ preferably: } \phi_{V3-V4} \approx x^{3/2}$$

$$\phi_{V1-V2} \approx \phi_{V2-V3} \approx x^2.$$

The resulting gear stepping constitutes a mixture of geometric and progressive stepping and is therefore referred to as quasi-progressive.

It is possible to refine said quasi-progressive gear stepping in that, when using the shift sequence illustrated in FIG. 18, the fifth forward gear V5 is dispensed with. When selecting the individual numbers of teeth corresponding to the table of FIG. 21, virtually ideal progressive gear stepping is then provided, corresponding to the table of FIG. 22. In this case, however, only eight forward gears are then provided.

Between the second forward gear V2 and the eighth forward gear V8, said group transmission configuration according to FIG. 21 and FIG. 22 has a strictly monotonously falling profile of the gradations φ and therefore actually progressive gear stepping. Only the gradation φ between the first forward gear V1 and the second forward gear V2 is duly slightly too low within the context of purely progressive stepping, but nevertheless still entirely utilizable. In principle, said gradation $\phi_{V1-V2}$ is identical to the gradation $\phi_{V4-V5}$ between the fourth forward gear V4 and the fifth forward gear V5.

$$\phi_{V1-V2} = \phi_{V4-V5}.$$

Theoretically, it is also possible to utilize yet another forward gear as an intermediate gear V4b between the fourth forward gear V4 and the fifth forward gear V5. Said intermediate gear V4b duly does not fall within the geometric gear stepping. The intermediate gear may however be used in practical driving operation if, for example, a downshift is desirable or necessary in a certain driving situation but a downshift from the fifth forward gear V5 to the fourth forward gear V4 would, in the physical driving situation, lead to an excessively large jump in rotational speed.

In the same way, the intermediate gear V4b may be utilized when upshifting if a shift from the fourth forward gear V4 to the fifth forward gear V5 would result in an excessively large jump in rotational speed in the respective driving situation. This may be the case for example in the case of a vehicle in a highly loaded state and simultaneously driving on an incline. An excessively large rotational speed jump could have the result here that—on account of the excessively low engine rotational speed level to be set—the engine power in the fifth forward gear would lie below the engine power in the fourth gear, such that a downshift process would be required again in order to prevent the vehicle from losing speed.

The corresponding transmission ratios with the intermediate gear 4b on the basis of the preceding transmission configuration are illustrated in the table of FIG. 23.

The embodiment illustrated in FIG. 15 to FIG. 17 of the group transmission according to FIG. 14 as a geometrically stepped group transmission with nine gears may also be designed as a fast gear transmission. In a fast gear transmission of said type, one forward gear or a plurality of forward gears has or have an overall transmission ratio $i_{overall}$ which is lower than the overall transmission ratio $i_{overall} = 1$ of the direct gear. A more detailed description is dispensed with here on account of the otherwise fundamental similarity.

An explanation is given below of the configuration of the above-described embodiments as fast gear transmissions. A fast gear transmission of said type has, in contrast to the transmissions described above, at least one forward gear which provides a step-up transmission ratio or has a lower transmission ratio than the direct gear. Said fast gear transmissions are in contrast to direct gear transmissions whose highest gear is the direct gear.

The two quasi-progressively or ideally-progressively stepped embodiments illustrated in FIG. 18 to FIG. 23 of the group transmission according to FIG. 14 may likewise be designed as fast gear transmissions. Here, some fundamental properties vary, such that the respective embodiments are described separately below.

In the progressively-stepped configuration as a fast gear transmission with eight forward gears, gear stepping is provided which approximates to an even greater degree to ideally-progressive gear stepping than in the progressively-stepped configuration as a fast gear transmission with eight forward gears. In contrast to the configuration as a direct gear transmission, a—normally unutilized—intermediate gear is formed by means of the forward gearwheel stage G2 in the configuration as a fast gear transmission. If the gradations $\phi_{V1-V2}$ and $\phi_{V4-V5}$ were also identical in the configuration as a direct gear transmission, then here, this is the case in principle for the gradations $\phi_{V2-V3}$ and $\phi_{V4-V5}$.

$$\phi_{V2-V3} = \phi_{V4-V5}.$$

The identical gradations φ therefore lie closer to one another, which is advantageous with regard to the profile of the gradations. In this connection, it is advantageous for the gradation $\phi_{V3-V4}$ which lies in between to also be selected to be of a similar magnitude. It is then true that:

$$\phi_{V3-V4} \approx \phi_{V2-V3} = \phi_{V4-V5},$$

or in other words:

The gradations $\phi_{V2-V3}$, $\phi_{V3-V4}$ and $\phi_{V4-V5}$ are selected to be of at least approximately equal magnitude.

Furthermore, in the configuration as a fast gear transmission with only one fast gear, the gradation $\phi_{V1-V2}$ is freely selectable, such that, overall, a monotonously falling profile for the gradations φ is generated across all the gears, which is not possible in the design as a direct gear transmission. The tables of FIG. 24 and FIG. 25 illustrate a configuration of said type as a fast gear transmission with only one fast gear.

The table of FIG. 26 illustrates the preceding configuration, but with an intermediate gear 4b additionally being provided. For the reasons already stated with regard to FIG. 23, however, said intermediate gear 4b need not be utilized under normal circumstances.

Figure 27:
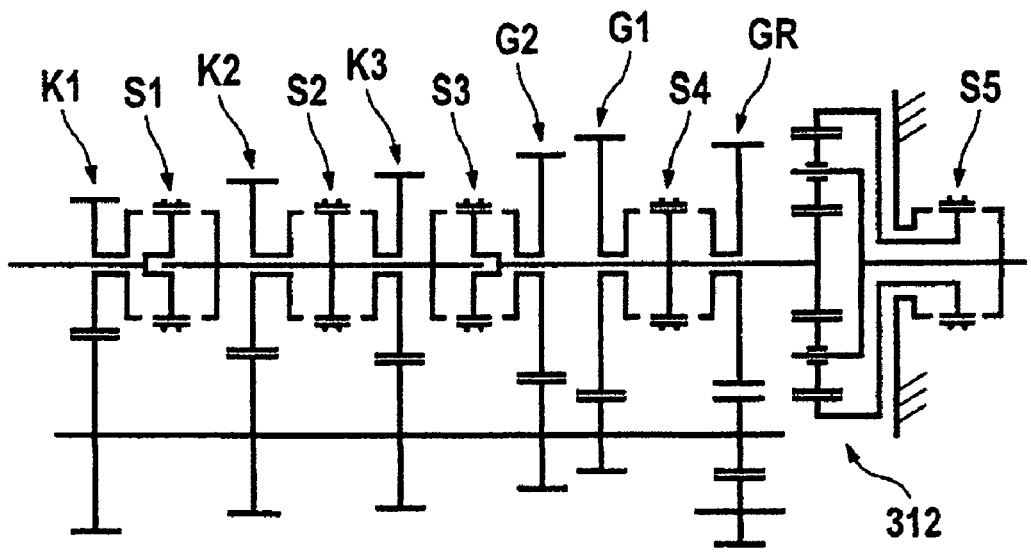
FIG. 27 shows a group transmission with quasi-progressive transmission stepping, FIG. 28 schematically shows the force flow in the group transmission according to FIG. 28
Figure 28:
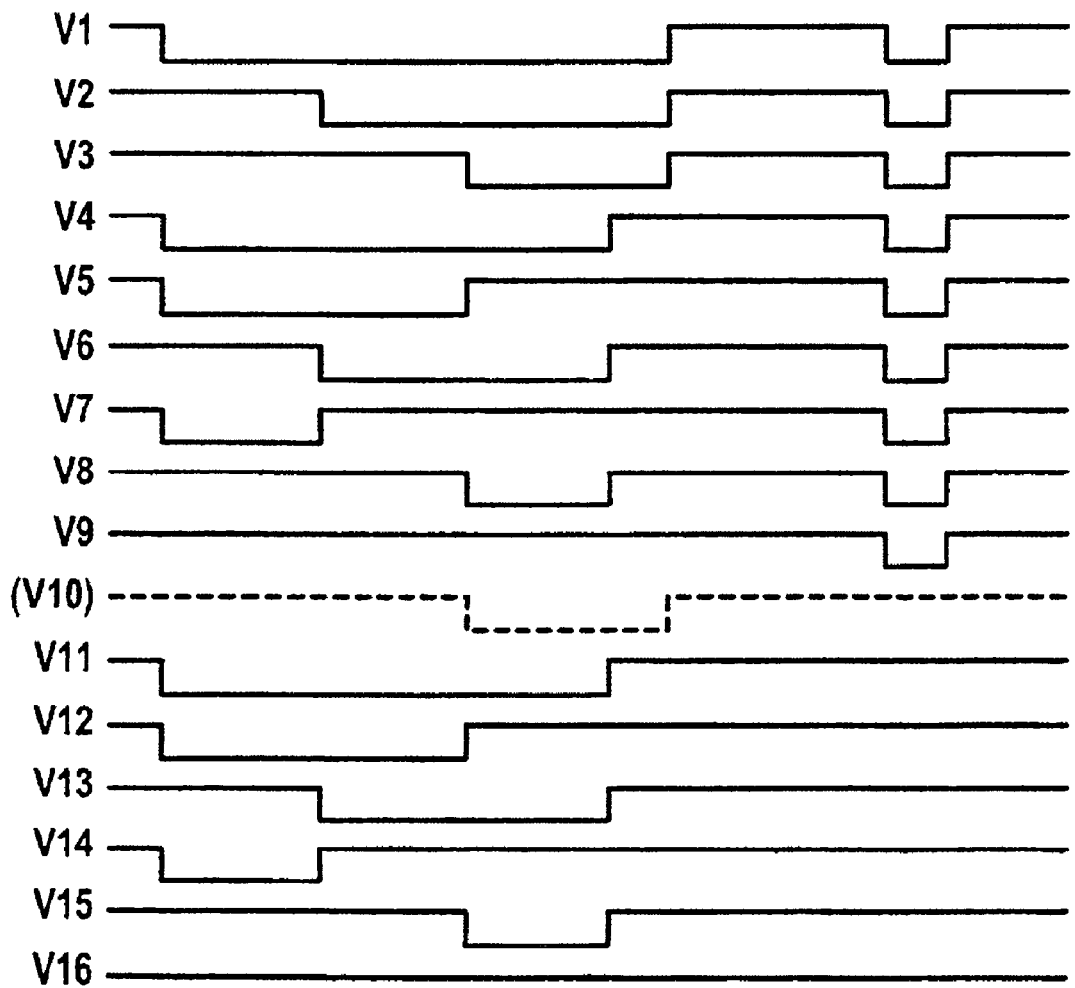

FIG. 27 to FIG. 29 show a further group transmission with quasi-progressive stepping. The selection of the transmission ratio is carried out here in such a way that the two lowest gradations are greater than the higher gradations of the same group 210 or 211.

For the lower group 210, the following relationships, for example, are then true for the individual gradations φ:

$$\phi_{V3-V4} \approx \phi_{V4-V5} \approx \phi_{V5-V6} \approx \phi_{V6-V7} \approx \phi_{V7-V8} \approx \phi_{V8-V9} = x$$

$$\phi_{V1-V2} \approx \phi_{V2-V3} \approx x^2.$$

Alternatively, the gradation $\phi_{V3-V4}$ may also be configured in another way. Analogously to the splitter transmission described above, the gradation φ of x may be selected in the range $$x \leq \phi_{V3-V4} \leq x^2.$$

A value of greater than x represents an advantageous configuration in particular for a variant with fifteen forward gears analogously to FIG. 10, since as a result of the lower three forward gears in the upper group 211 being omitted, the three large gradations correspondingly do not occur again.

The two large gradations then also occur, in principle, in the upper group 211. However, since small gradations should be realized in the upper forward gears with regard to drivability, it is expedient for the two lowest forward gears in the upper group 211 not to be utilized. In this way, a group transmission having sixteen forward gears and having two widely-stepped creep gears is provided. In the upper group 211, the central gearwheel stage G1 is utilized in only one— specifically the tenth—forward gear V10. If the utilization of said tenth forward gear V10 is dispensed with, then it is possible for the central gearwheel stage G1 to be designed, analogously to the approach described above—as a true creep gearwheel stage with a very narrow toothing. Here, the transmission ratio of the range group 312 should be selected in each case such that, during a shift of the range group 312, an expedient—that is to say not excessive—gradation is generated.

Some of the neutral states N illustrated in the tables of FIG. 4, FIG. 10, FIG. 13, FIG. 15 and FIG. 29 are not strictly necessary to engage the respectively desired gear. Said neutral states N are illustrated in brackets in the tables. For example, during the shift, illustrated for the group transmission 79 according to FIG. 1 in table 4, into the second forward gear V2, it is not strictly necessary for the second gearshift clutch S2 to be placed into the neutral state N2. Instead, said second gearshift clutch S2 may also remain in the forward position S2l after the shift from the first forward gear V1 into the second forward gear V2. This firstly has the advantage that a shift movement may be omitted, and secondly, the intermediate shaft 4 does not lose rotational speed, such that reduced synchronizing power is required for the subsequent shift into the third forward gear V3 or beyond. However, in said case, it is necessary for the intermediate shaft to be dragged together with a toothing, resulting in slightly higher drag losses. Said slightly higher drag losses are however not significant in terms of fuel consumption in the relevant gears.

In the group transmission according to FIG. 1 to FIG. 4, the direct gear without a step-down transmission ratio in the range group 12 is the penultimate forward gear V17. Accordingly, said group transmission is a single fast gear transmission. In addition to said design as a single fast gear transmission, the group transmission may also be designed as a direct gear transmission according to FIG. 8 to FIG. 10. In a direct gear transmission of said type, the direct gear is the final forward gear V18. Furthermore, the group transmission may also be designed as a double fast gear transmission as per FIG. 11 to FIG. 13. An embodiment which is not illustrated in the drawings, as a triple fast gear transmission, is likewise possible. In the embodiment as a triple fast gear transmission, the second forward gear of the main group is designed to have a step-up transmission ratio, such that transmission ratios of i<1 are generated in combination with all three transmission ratios of the front-mounted group.

In an alternative embodiment of the invention, only two input constants are provided. Here, in contrast to FIG. 1 and FIG. 3 and FIG. 6 and FIG. 7 and FIG. 8 and FIG. 11 and FIG. 14 and FIG. 27, the third or rearmost input constant K3 is dispensed with. In this way, axial installation space is saved and gears are dispensed with. Instead of the gearshift clutch S2, a "half gearshift clutch" is provided in said embodiment. A "half gearshift clutch" of said type has only a neutral position and a single-sided coupling capability.

In a further alternative embodiment, more than three input constants are provided.

It is likewise possible, in relation to the above-stated figures, to omit a gearwheel stage in the main transmission.

The described embodiments are exemplary configurations. A combination of the described features for different embodiments is possible. Further features, which are not specifically described, of the device parts belonging to the invention may be gathered from the geometries of the device parts illustrated in the drawings.

What is claimed is:

1. A group power transmission (79) for a motor vehicle, including an input shaft (14), an intermediate shaft (4) and a main shaft (23) arranged
    coaxially with respect to one another and in succession, one next to another
    so as to be offset with respect to and parallel to at least one countershaft (15), two shiftable loose wheels (drive wheels 21, 22) being mounted, as part of input constants (K1, K2), coaxially on the input shaft (14) and on the intermediate shaft (4), with said two input constants (K1, K2) being followed in the force flow by at least two gearwheel stages (G2, G1, GR) of a main group (16), which gearwheel stages (G2, G1, GR) comprise additional loose wheels (36, 37, 34) which are mounted coaxially on the main shaft (23) and which can be rotationally fixedly coupled thereto, with it being possible for the countershaft (15), in a direct gear, to be decoupled with regard to its rotational movement from the input shaft (14), the intermediate shaft (4) and the main shaft (23).

2. The group transmission as claimed in patent claim 1, wherein, in addition to the two shiftable loose wheels (drive wheels 21, drive wheel 22), a third, further shiftable loose wheel (3) is mounted coaxially on the intermediate shaft (4) such that a third input constant (K3) is formed, with the force flow in the group transmission running selectively via one of the three input constants (K1, K2 or K3) and subsequently via the second gearwheel stage (G2 or G1 or GR) which is situated in the main group (16) and which, here, comprises a further loose wheel (36 or 37 or 34 respectively), which is mounted coaxially on the main shaft (23) and which can be rotationally fixedly coupled thereto, of the second gearwheel stage.

3. The group transmission as claimed in claim 1, wherein at least one of the two or three input constants (K1, K2, K3) can be coupled to the intermediate shaft (4), with said one input constant (K2 or K3) being preceded in the force flow by another input constant (K1) which can be coupled to the input shaft (14), such that the one input constant (K2 or K3) is utilized as a further gearwheel stage.

4. The group transmission as claimed in claim 3, wherein, in the case of the force flow via the two input constants (K2 or K3 and K1), a gearshift clutch (S3) for the rotationally fixed connection of the intermediate shaft (4) to the main shaft (23) is engaged.

5. The group transmission as claimed in claim 3, wherein said gearshift clutch (S3) for the rotationally fixed connection of the intermediate shaft (4) to the main shaft also has a position in which a rotationally fixed connection can be produced between the main shaft (23) and a loose wheel (36) of the main group (16).

6. The group transmission as claimed in claim 3, wherein the third input constant (K3 or K2) can also be coupled by means of a gearshift clutch (S2) to the intermediate shaft (4), such that said third input constant (K3 or K2) can also be preceded in the force flow by the other input constant (K1) which can be coupled to the input shaft (14).

7. The group transmission as claimed in claim 1, wherein to decouple the countershaft (15) in the direct gear, two gearshift clutches (S1, S2) which are arranged axially between the three loose wheels (drive wheels 21, 22, 3) of the input constants (K1, K2, K3) are provided with in each case two engagable positions (S1l, S1r, S2l, S2r) and a neutral position (N1, N2), with it being possible by means of the first gearshift clutch (S1) firstly in the one engagable position (S1l) for the input-side loose wheel (drive gearwheel 21) of the input constant (K1) to be rotationally fixedly coupled to the input shaft (14) and secondly in the other engagable position (S1r) for the input shaft (14) and the intermediate shaft (4) to be rotationally fixedly coupled to one another, with it being possible by means of the second gearshift clutch (S2) firstly in the one engagable position (S2l) for the loose wheel (drive gearwheel 22) which is preceded by the input-side loose wheel (drive gearwheel 21) of the foremost input constant (K1) to be rotationally fixedly coupled to the intermediate shaft (4) and secondly in the other engagable position (S2r) for the third loose wheel (drive gearwheel 3) to be rotationally fixedly coupled to the intermediate shaft (4), with a gearshift clutch (S1) being placed for this purpose in a right-hand engagable position (S1r) and the other gearshift clutch (S2) being placed for this purpose in a central neutral position (N2) such that there is no rotationally fixed connection between the loose wheels (22, 3) and the intermediate shaft (4).

8. The group transmission as claimed in claim 7, wherein at least two countershafts (15a, 15b) are arranged in such a way that toothings of toothing engagements between the loose wheels (drive gearwheels 22, 3) of the intermediate shaft (4) and fixed wheels (20, 2) of the countershafts (15a, 15b) have helical toothings or straight toothings, with radial forces at said toothing engagements canceling one another out in total in such a way that the intermediate shaft (4) is substantially not loaded by a resultant radial force from the tooth engagements, with the intermediate shaft (4) being mounted exclusively axially with respect to the input shaft (4) and main shaft.

9. The group transmission as claimed in claim 7, wherein at least two—in particular three—countershafts (15a, 15b) are arranged in such a way that toothings of toothing engagements between the loose wheels (drive gearwheels 22, 3) of the intermediate shaft (4) and fixed wheels (20, 2) of the countershafts (15a, 15b) have helical toothings or straight toothings, with radial forces at said toothing engagements canceling one another out in total in such a way that the intermediate shaft (4) is substantially not loaded by a resultant radial force from the tooth engagements, with the loose wheels of the intermediate shaft being mounted, in vibration-free operation, exclusively axially with respect to the intermediate shaft.

10. The group transmission as claimed in claim 9, wherein the intermediate shaft (4) is mounted with respect to the input shaft (14) and/or the main shaft (23) by means of a rolling bearing whose one bearing ring (bearing outer ring 102) has radial play (104).

11. The group transmission as claimed in claim 9, wherein at least two—in particular three—countershafts (15a, 15b) are arranged in such a way that toothings of toothing engagements between the loose wheels (drive gearwheels 22, 3) of the intermediate shaft (4) and fixed wheels (20, 2) of the countershafts (15a, 15b) have helical toothings or straight toothings, with radial forces at said toothing engagements canceling one another out in total in such a way that the intermediate shaft (4) is substantially not loaded by a resultant radial force from the tooth engagements, with at least one rolling bearing being provided on the intermediate shaft (4), which rolling bearing can absorb axial forces to at least twice the magnitude as it can radial forces.

12. The group transmission as claimed in claim 11, wherein the rolling bearing on the intermediate shaft can absorb axial forces to at least nine times the magnitude as it can radial forces.

13. The group transmission as claimed in claim 1, wherein shifts are automated.

14. The group transmission as claimed in claim 13, wherein an actuator for actuating the gearshift clutch (S1) can assume precisely two positions (S1l and S1r), such that a central neutral position (N1) may duly be run through during shifts between said two positions (S1l, S1r) but may not be actively held.

15. The group transmission as claimed in claim 1, wherein some of the transmission ratio steps between in each case two adjacent gears may deviate from one another.

16. The group transmission as claimed in claim 15, wherein the transmission ratio steps between in each case two adjacent relatively low gears are significantly larger than the transmission ratio steps between in each case two adjacent relatively high gears.

* * * * *